Figure 1:
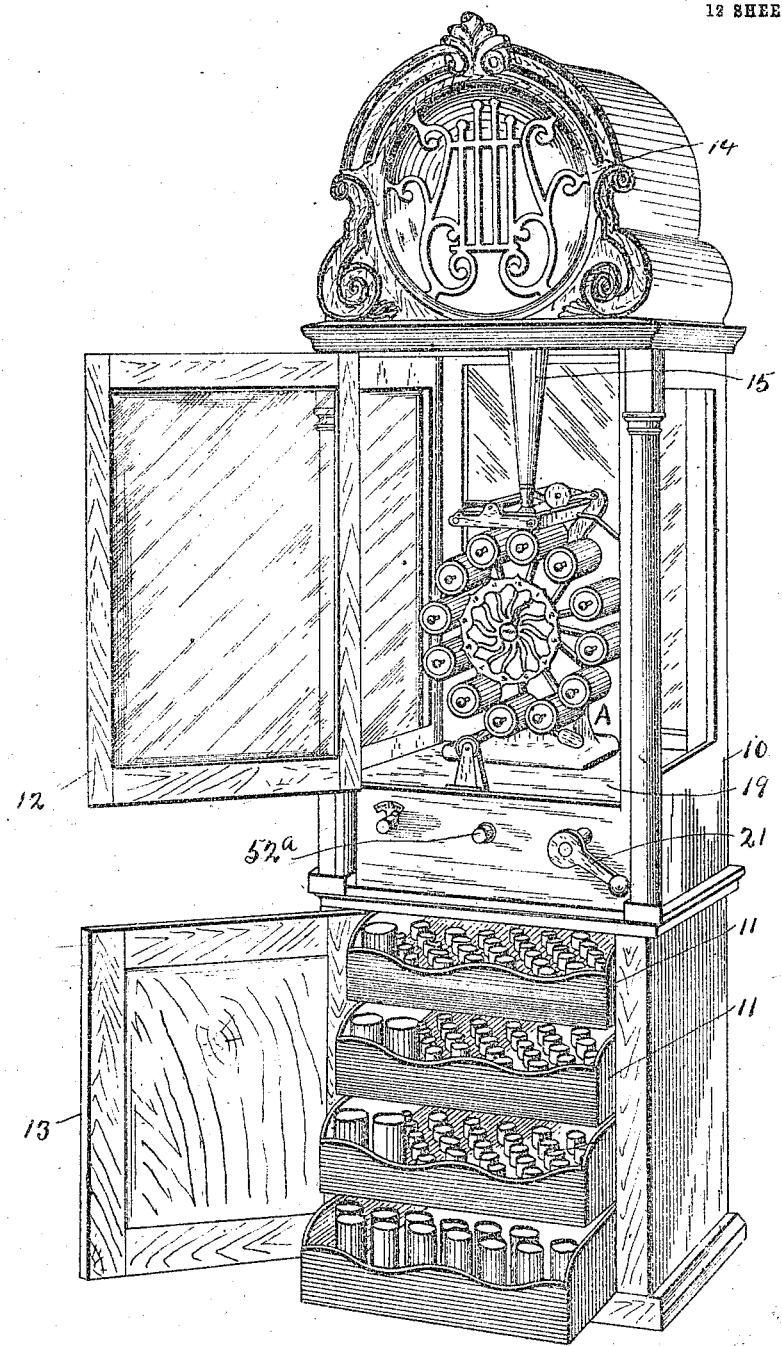

J. ROEVER.
MULTIPLE PHONOGRAPH.
APPLICATION FILED APR. 1, 1912.

1,072,873.

Patented Sept. 9, 1913.

12 SHEETS—SHEET 2.

WITNESSES
John C. Kopf
Geo. A. Sims

INVENTOR
Julius Roever,
BY
W. P. Hutchinson,
ATTORNEY

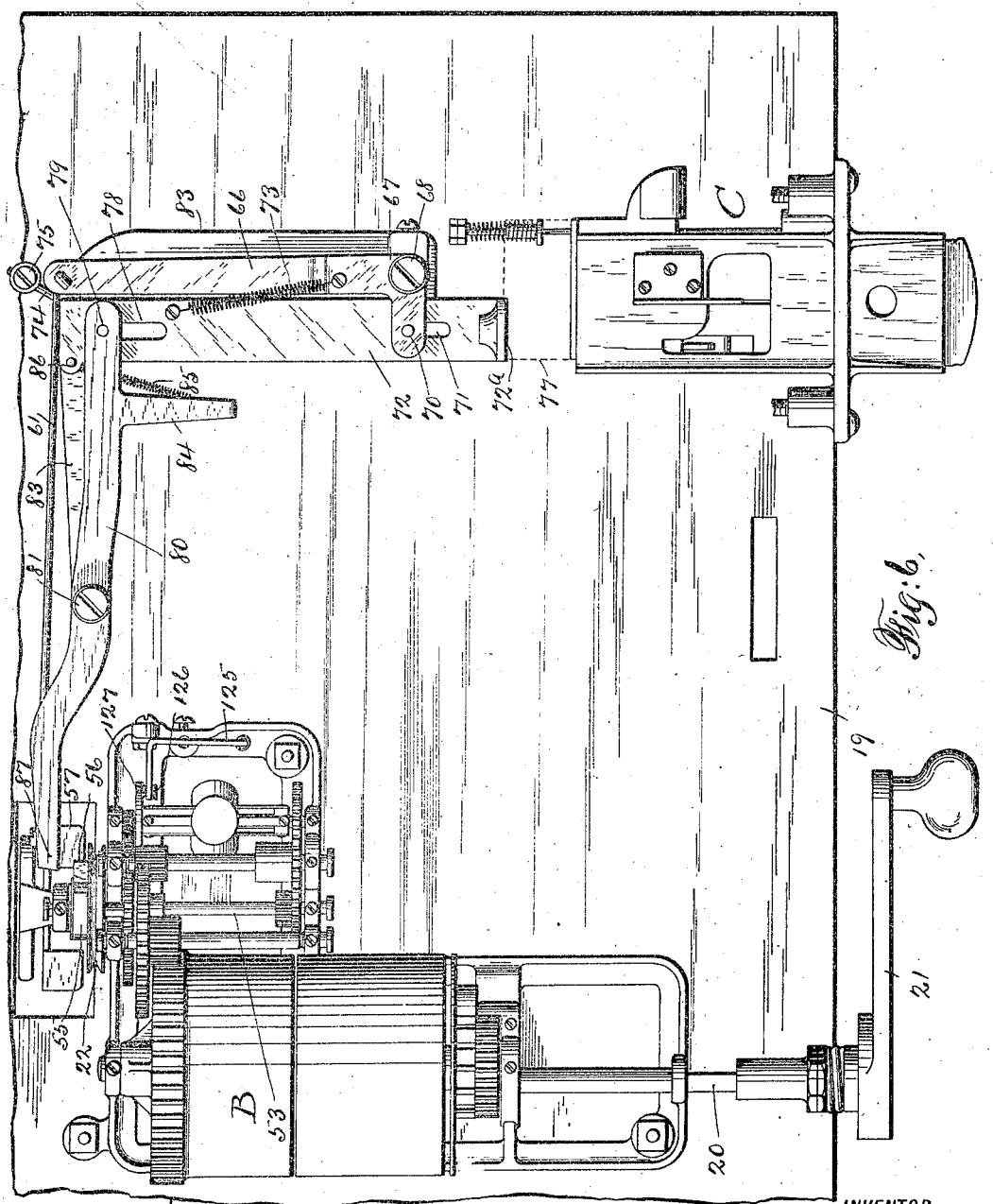

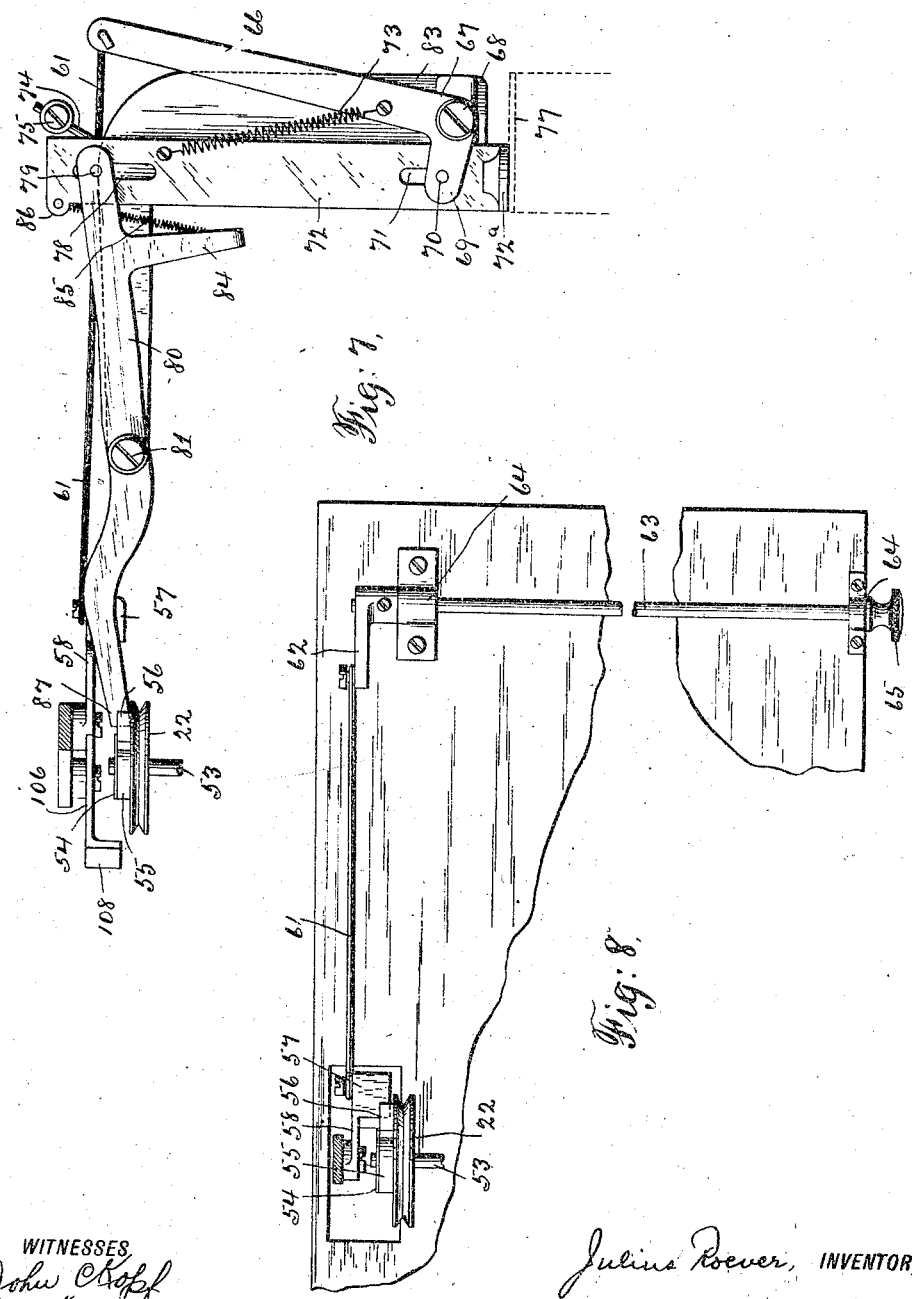

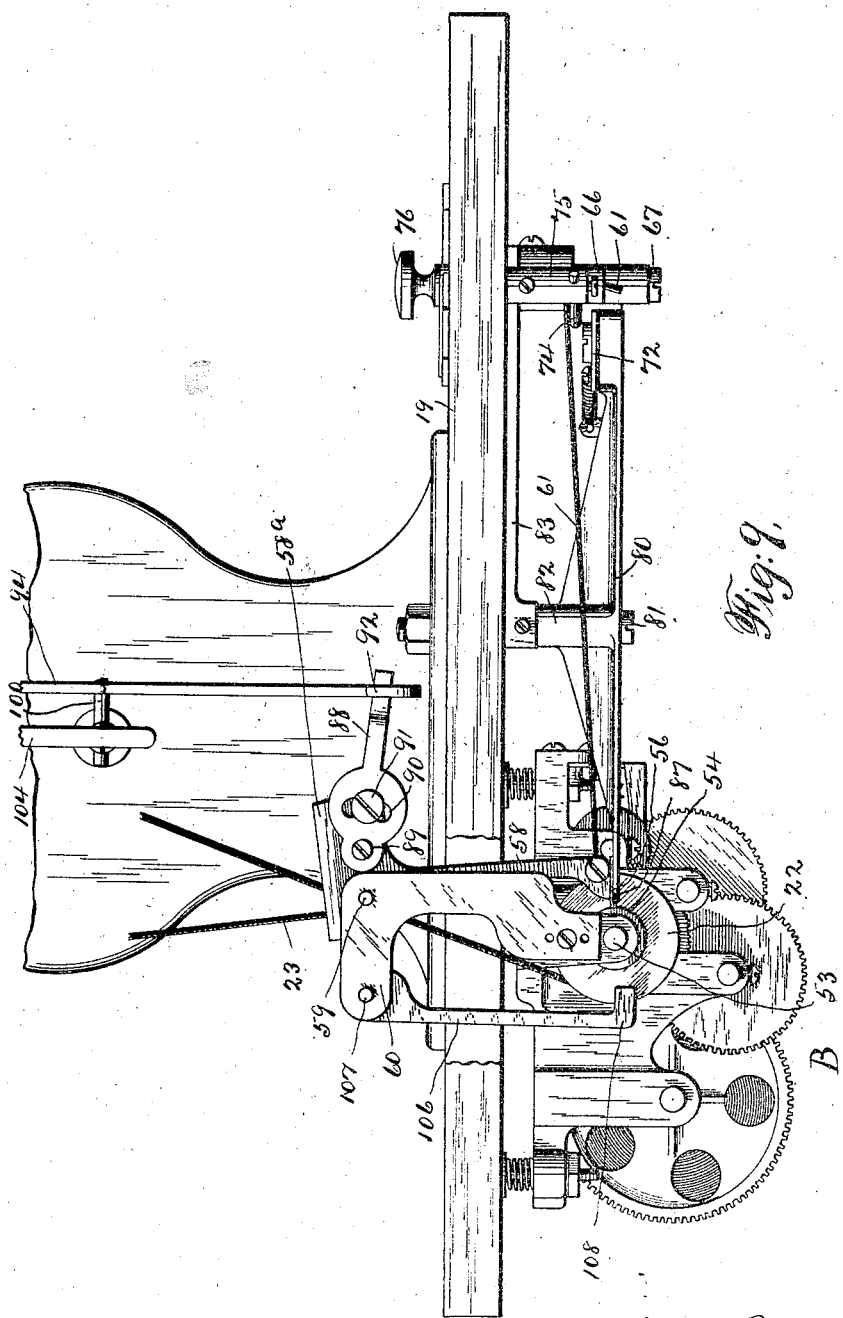

J. ROEVER.
MULTIPLE PHONOGRAPH.
APPLICATION FILED APR. 1, 1912.

1,072,873.

Patented Sept. 9, 1913.
12 SHEETS—SHEET 10.

WITNESSES
John C. Kopf
Geo. A. Lewis

INVENTOR
Julius Roever,
BY
W. P. Hutchinson,
ATTORNEY

J. ROEVER.
MULTIPLE PHONOGRAPH.
APPLICATION FILED APR. 1, 1912.

1,072,873.

Patented Sept. 9, 1913
12 SHEETS—SHEET 11.

WITNESSES

Julius Roever, INVENTOR.

BY
ATTORNEY

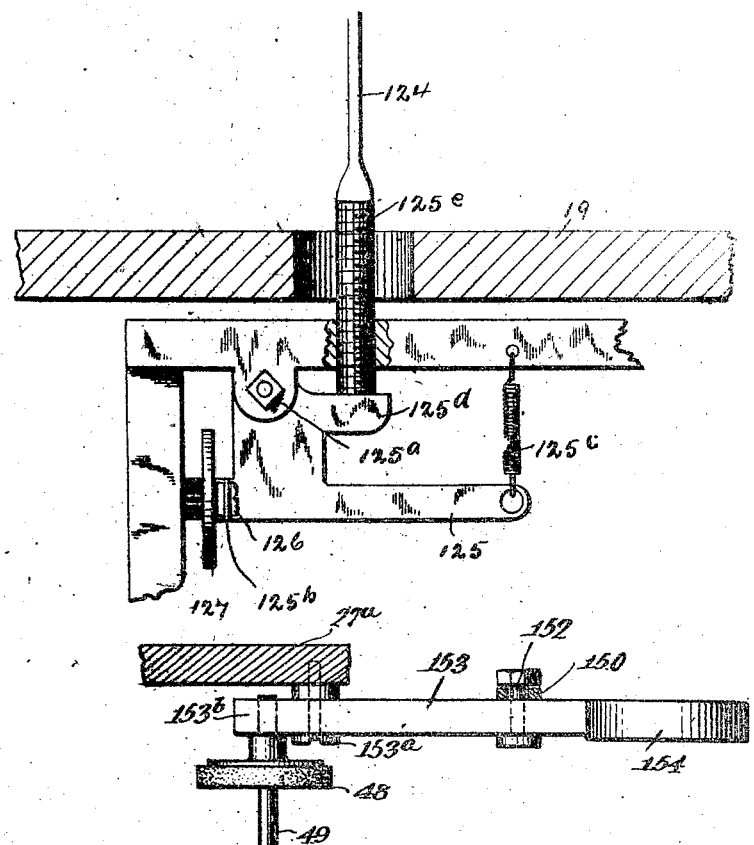

UNITED STATES PATENT OFFICE.

JULIUS ROEVER, OF NEW YORK, N. Y.

MULTIPLE PHONOGRAPH.

1,072,873.   Specification of Letters Patent.   Patented Sept. 9, 1913.

Application filed April 1, 1912. Serial No. 687,849.

*To all whom it may concern:*

Be it known that I, JULIUS ROEVER, of New York, borough of Brooklyn, county of Queens, and State of New York, have invented a new and useful Improvement in Multiple Phonographs, of which the following is a full, clear, and exact description.

My invention relates to improvements in multiple phonographs such as employ a rotatable wheel or plate carrying a plurality of renewable phonograph records, and in which the rotation of the wheel brings the records successively or selectively as desired, into engagement with the reproducing mechanism.

The object of my invention is to produce a machine of this kind in which the mechanism is absolutely reliable and will operate successfully and for a long time without getting out of order, and in which the machine can be adapted for use as a so-called home machine, that is for use in private places, where all the records can be played consecutively, or selectively as desired, or in which slot mechanism can be used for adapting the machine to public places where by the dropping of a coin, a record or records can be played. I am aware that a machine of this general kind is not broadly new, but such a machine is for its success necessarily dependent on the construction and arrangement of many of its parts, and my invention relates especially to certain features of construction or groups of co-acting parts, which will enable the beforementioned result to be attained in a mechanical and reliable manner. These improved details I will proceed to point out in the specification and refer to in the claims which follow.

Reference is to be had to the accompanying drawings forming a part of this specification, in which similar reference characters indicate corresponding parts in all the views.

Figure 2:
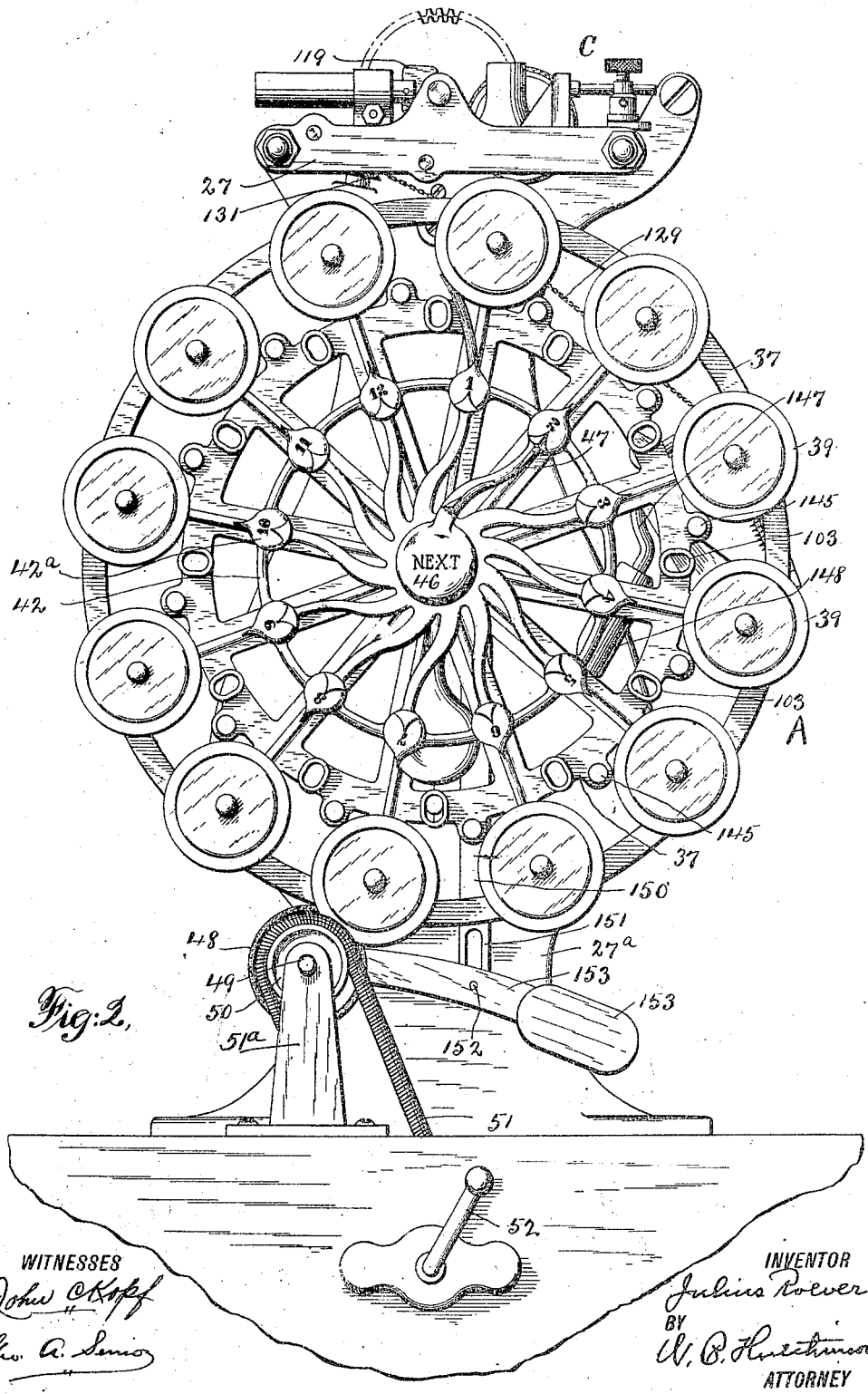
Figure 3:
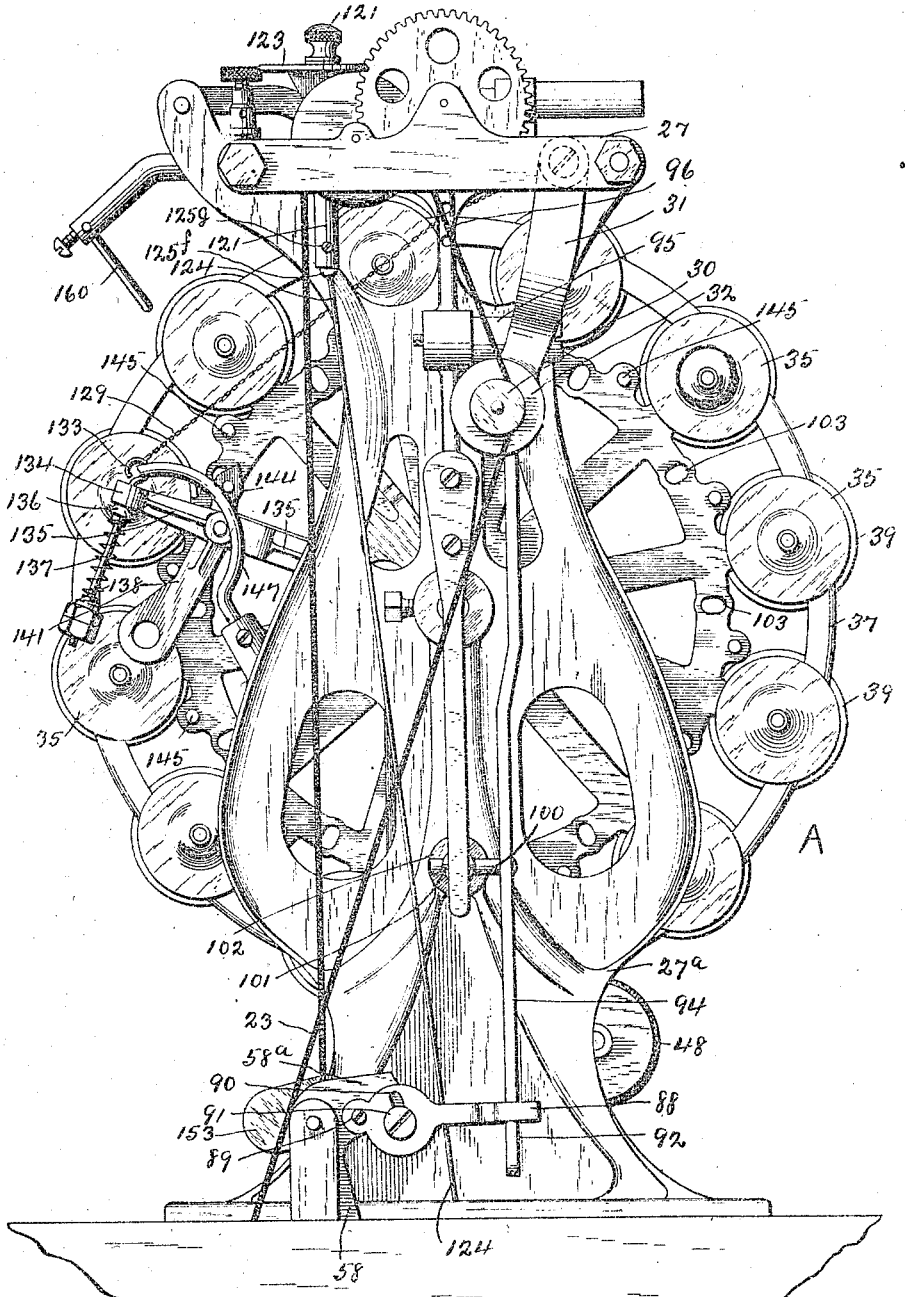
Figure 4:
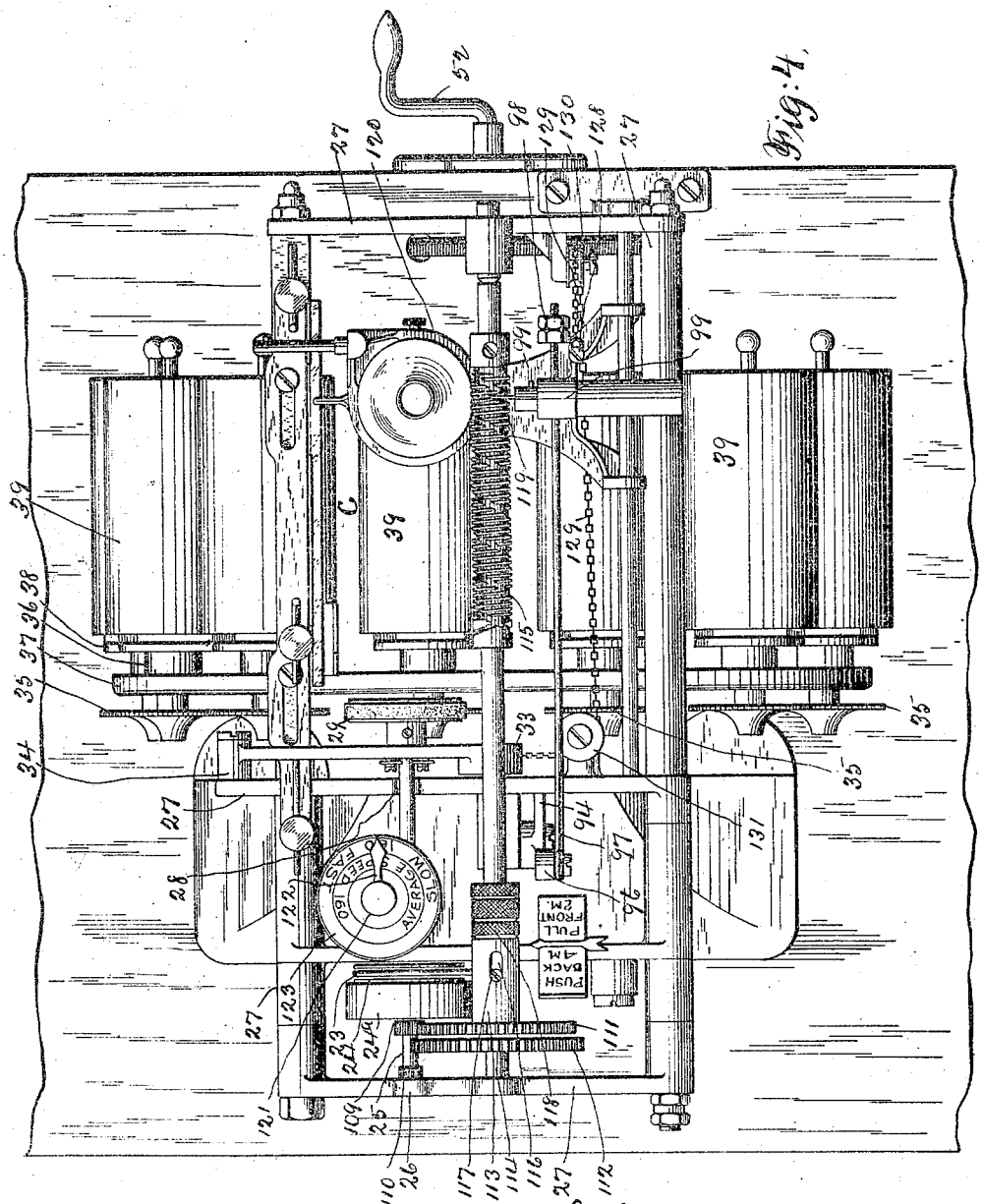
Figure 5:
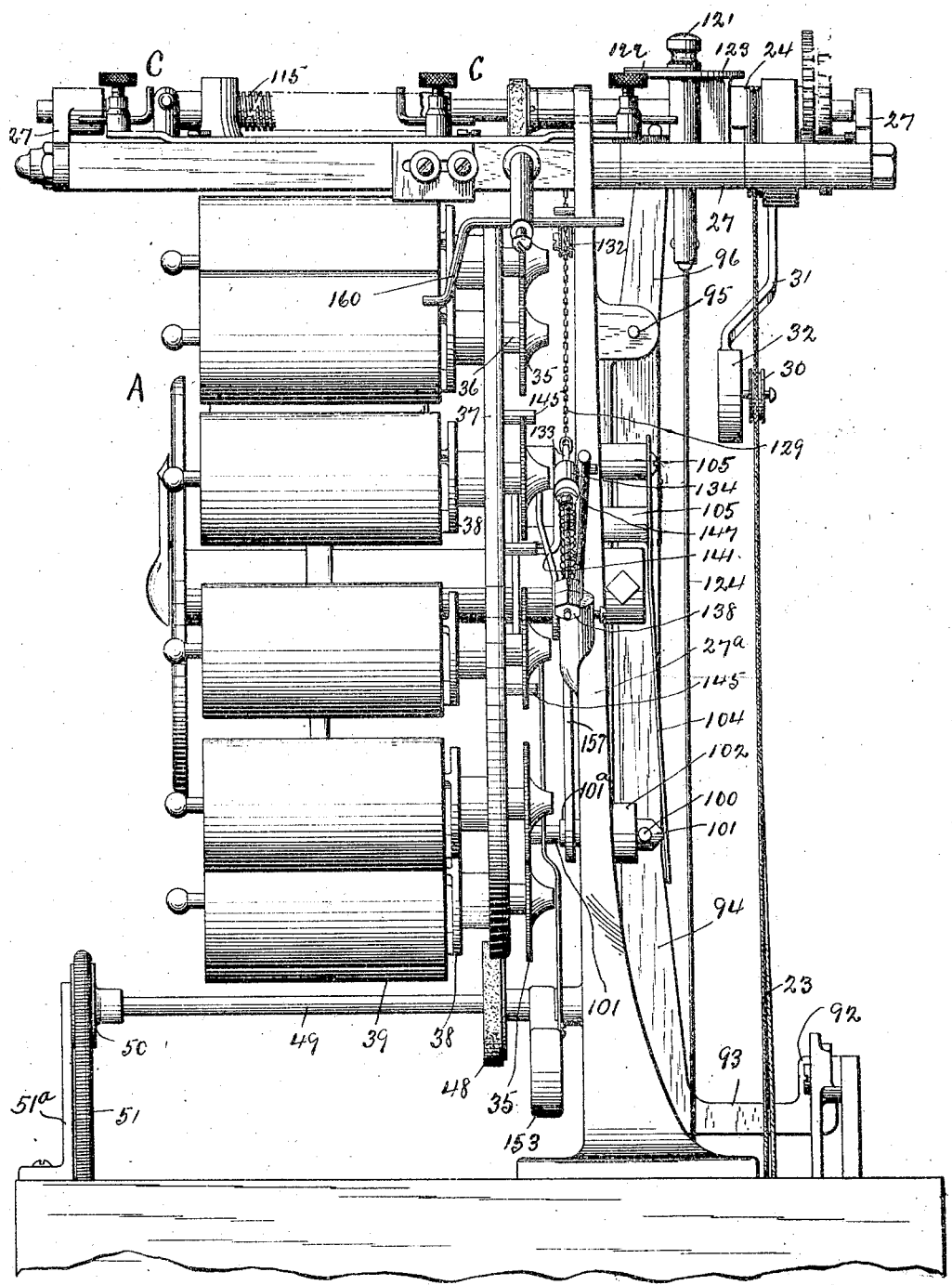
Figure 10:
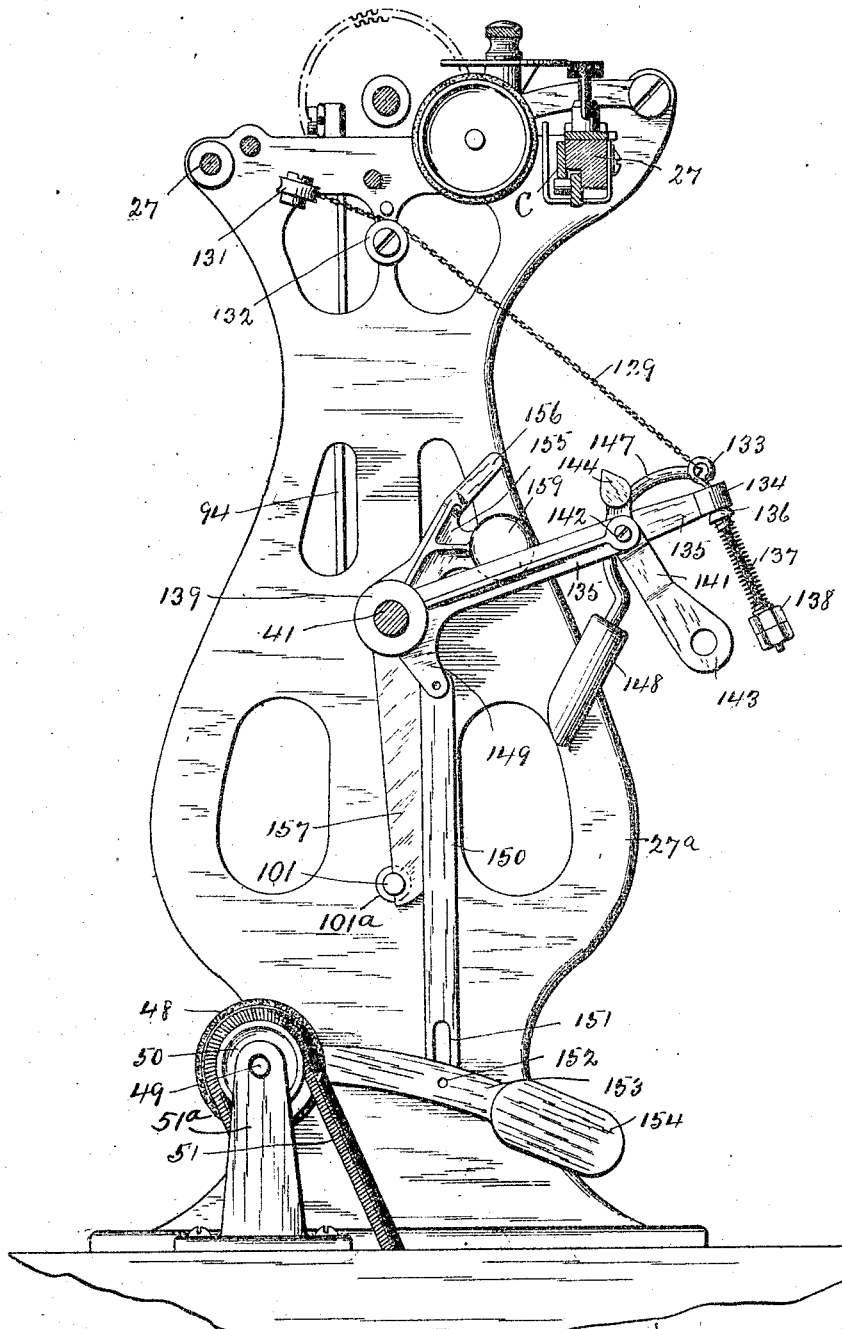
Figure 11:
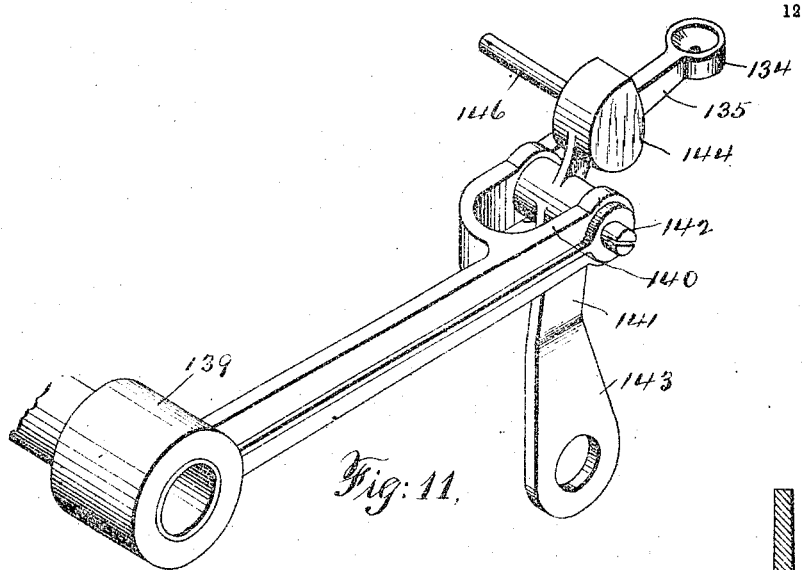
Figure 12:
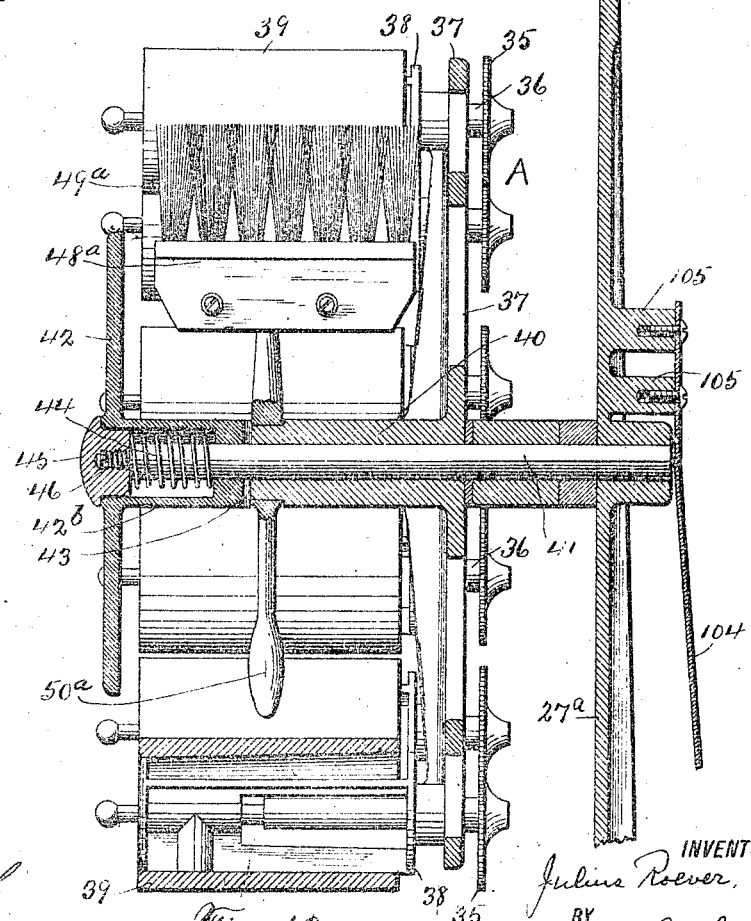
Figure 13:
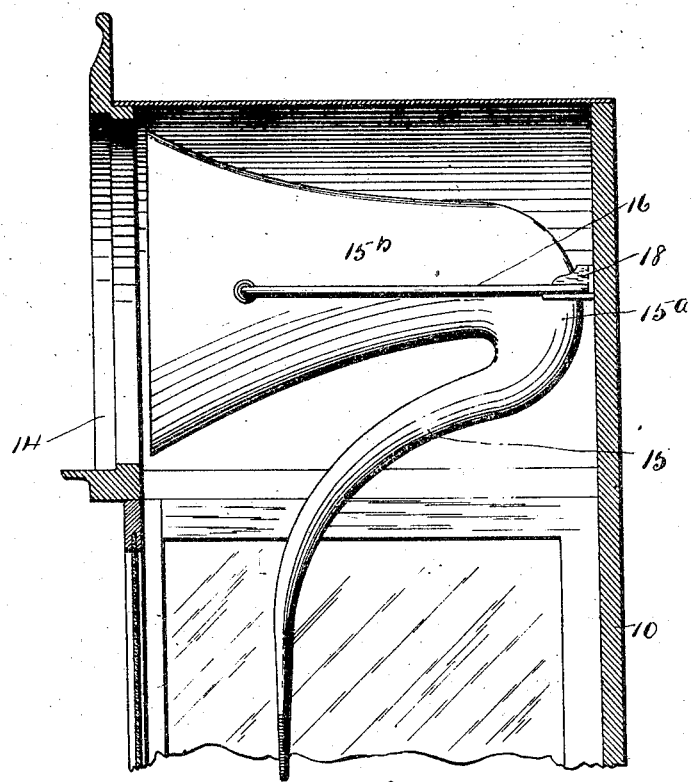
Figure 14:
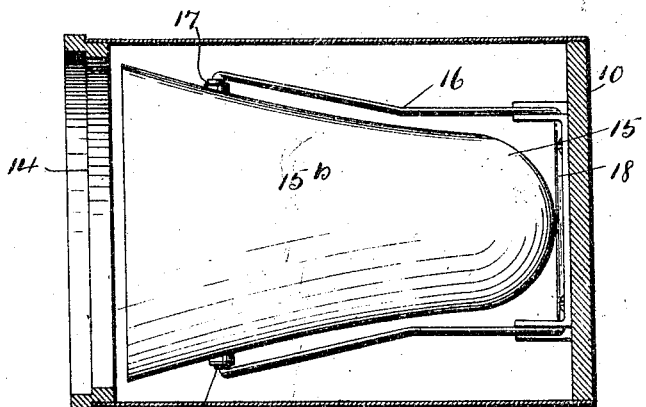

Figure 1 is a perspective view of the complete machine with the case thrown open so as to show the general arrangement of the parts. Fig. 2 is an enlarged front elevation of the upper portion of the machine showing especially the arrangement of the record-wheel, the grouping of records, and the relation of the carriage to the record wheel. Fig. 3 is a rear elevation of the structure shown in Fig. 2. Fig. 4 is a plan view of the record wheel and carriage. Fig. 5 is a side elevation of the upper part of the machine which comprises the greater portion of the mechanism. Fig. 6 is an inverted plan view of the motor and the mechanism for starting and stopping it either by a coin controlled mechanism or by other manual means. Fig. 7 is a detail of the means for starting and stopping the motor, showing the arrangement of both the coin or slot mechanism, and the secondary or manual means of stopping and starting. Fig. 8 is a detail inverted plan showing especially the ordinary manual means of starting the motor. Fig. 9 is a side elevation of the motor and its connected hand controlling and regulating parts. Fig. 10 is a rear elevation of the upper part of the machine with a portion of the mechanism removed, and showing especially a part of the mechanism for advancing the records from one position to another. Fig. 11 is a detail of one of the shifting pawls and connections used in shifting the records. Fig. 12 is a detail sectional view of the record wheel, and shows particularly the manner in which it is mounted and supported. Fig. 13 is a detail sectional view illustrating in side elevation, the horn of the machine and its support. Fig. 14 is a sectional plan view of the horn and its support. Fig. 15 is a detail of the mechanism for controlling the speed of the motor, and Fig. 16 is a sectional plan view showing means for supporting the friction wheel for turning the record wheel for the purpose of selecting a record.

Referring to Fig. 1, the machine is preferably provided with an inclosing casing 10 which can be of an ornamental nature, and which can be of any approved design, the casing having preferably a lower compartment containing drawers 11 in which the records can be stored, and the upper compartment carrying the record wheel A and the greater part of the operating mechanism. The casing is also preferably provided with doors 12 and 13 to close in the aforementioned parts, and has at the top an opening 14 which registers with the mouth of the horn 15. This arrangement is shown clearly in Figs. 1, 13 and 14. The horn 15 has a goose-neck bend as shown at 15$^a$ in Fig. 13, and is enlarged at this point and then extended forward in a practically horizontal direction as shown at 15$^b$. This allows the sound vibrations to be collected at the back of the horn and then thrown forward in an effective manner. In the machine as will be hereinafter seen, the reproducer connected with the horn moves backward and forward, and so provision is made for a slight oscillation of the horn. This is shown clearly in Fig. 14, where a fork 16 is illustrated as straddling the horn, with its ends pivoted to the horn near the mouth of the latter as shown at 17, while the base of the fork 16 is pivoted in a bracket 18. The record wheel which I have referred to in a general way as A, and most of the mechanism associated and connected with it, are arranged in the upper part of the casing and upon the floor or table 19. The mechanism of the machine is all driven by a motor B which is shown clearly in Figs. 6 and 9, and which can be any approved type of motor, though a spring motor is generally used. I do not refer to the details of the motor as they have nothing to do with this invention, though the means for stopping and starting it, and for regulating its speed, will be hereinafter referred to. The motor, as is usual in such cases, is supported beneath the table 19 and has a shaft 20 projecting forward through the casing 10, and to which a removable crank 21 is affixed for winding up the motor at necessary intervals. The motor carries a pulley 22 from which extends a belt 23, this passing up through the table 19 and connecting with a pulley 24 on the shaft 25 at the top of the machine, this shaft being loosely supported at one end as shown at 26 in the horizontal or carriage frame 27 which extends across the top of the wheel A and parallel with the axis of the wheel. The shaft 25 carries also a fly-wheel 24ª at the side of the pulley 24, and is held loosely at 26 so that its opposite end can be lifted, and to this end the shaft near the inner or front end rests in a suitable bearing 28 on a part of the frame 27, and is provided with a friction wheel 29 for driving the individual records, as will presently appear. This loose support for the shaft is not shown in detail, as it is common to machines of this class and is not here claimed. The frame 27 just referred to is supported on the main frame or pedestal 27ª, which rises from and is secured to the table 19. The belt 23 just referred to has one member preferably extended over the pulley 30 on the swinging arm 31 which is pivoted to the frame 27, and has a weight 32 at its free end so that the arm serves to take up the slack of the belt 23. The shaft 25 which is driven by the belt 23, has its free end held down by the weighted arm 33 which is pivoted as shown at 34 on a part of the frame 27. The shaft 25 carries the friction wheel 29 as stated, and this is adapted to severally or individually engage the friction disks 35 which are secured to the shafts 36, these being circumferentially arranged and journaled in the back 37 of the record wheel A. This back can be of any configuration, but is shown as formed of a spider construction having concentric rings. All this construction is not here claimed as novel. Each shaft 36 carries a record holder 38 which can be of any approved or preferred construction, and on which the cylindrical records 39 are slipped on and off as desired. The back 37 of the wheel A has a hub 40 which is pivoted on the shaft 41, this being secured in the main frame or pedestal 27ª, and the front of the wheel is formed of a removable spider or index plate 42, having suitable surfaces 42ª (see Fig. 2) spaced apart and numbered to correspond with the records. The hub 42ᵇ of the index plate 42 slides freely on and off the shaft 41, and has a match joint as shown at 43 in Fig. 12 by which it engages the hub 40, so that the two parts will turn together. The index plate 42 is held in place by the plug 45 (see Fig. 12) which fits in the hollow of the hub 42ᵇ, and is screwed to the threaded end 46 of the shaft 41. A spring 44 is arranged within the hollow of the hub 42ᵇ, and presses against the plug 45 so that the latter is held stationary while the wheel A, including the back 37 and the index plate 42, rotates. The plug 45 has a finger or pointer 47 which points a little to the right of the upper perpendicular part of the record wheel, as shown in Fig. 2, and when a certain record is desired, the wheel A is rotated until the record comes opposite the pointer, then if the machine is started, this record will be the next one played, as will be hereinafter described. The record wheel A rotates freely and independently of the mechanism which turns it to play a record, and to provide for turning the wheel to the desired position, a friction wheel 48 (see Fig. 5) is arranged to engage the rim of the back 37, and is carried by a shaft 49 which is arranged parallel with the shaft 41 and beneath the wheel A, the shaft 49 being mounted in suitable supports and having a pulley 50 thereon which is driven by a flexible belt 51 connecting with a pulley beneath the table 19, which pulley is not shown, as this means for turning the record wheel is not claimed, but the parts are disclosed for clearness. The pulley driving the belt 51 is turned either by a crank 52 on the front of the machine, or a milled wheel 52ª, as shown in Fig. 1.

Referring to Fig. 12, it will be seen that I show the brush 48ª having bristles 49ª which project upward and engage the surface of the record 39 which happens to be directly above the brush, and the shank 50ª of the brush is pivoted on the shaft 40, and the lower end is made sufficiently heavy to retain the brush in a substantially vertical position, while at the same time permitting it to oscillate as it is struck by the record so as to have a brushing effect thereon and clean off the dust which may be on the record, or which may be loosened by the stylus.

The machine is driven from the motor B, and the controlling mechanism is shown in Figs. 6 to 9. As here illustrated, the motor is provided with a shaft 53 from which power is taken and which carries the pulley 22 already referred to. This shaft is also provided with a drum 54 on which is a strap 55, one end being secured to the drum and the free end projecting radially as shown at 56 in Figs. 7 and 9. The machine is prevented from starting by a trip or foot 57 which swings into the path of the protruding end 56 of the brake strap. It will be seen that this will stop the machine, and it will prevent it from stopping with a violent jerk, as the brake strap 55 will first tighten itself around the drum, and finally stop the machine altogether. The trip or foot piece 57 is carried on the end of the swinging arm 58 which projects upward through the table 19, and is pivoted as shown at 59 in Fig. 9, upon a part of the motor frame 60. The arm 58 is in the nature of a bell crank lever, and has an offset 58ª as shown in the aforesaid figure.

When the machine is used as a so-called home machine, that is without the slot attachment, the construction shown in Fig. 8 is used for starting, and here the arm 58 is pivotally connected by a rod 61 with a crank 62 on the shaft 63 which is mounted in suitable supports 64 and the front end of which projects to the front part of the machine, where it terminates in the milled wheel 65, so that by turning the milled wheel and shaft, the rod 61 pulls the foot piece or trip 57 out of the path of the break strap 56, and permits the machine to start. Obviously other means can be used for actuating the trip 57, and in Figs. 6, 7 and 9 I have shown a means which can be substituted for the particular arrangement of the shaft 63, and which is especially adapted for use where the machine is used as a combination home machine and coin operated machine. In this case, the end of the rod 61 is attached to the long arm 66 of the bell crank lever 67, which is pivoted beneath the table 19 as shown at 68, and the other arm 69 of which is provided with a pin 70 sliding in the slot 71 of the slide bar 72, which also connects with the arm 66 near the base of the latter by a spring 73 which serves to hold the slide plate 72 retracted. To start the machine independently of the coin mechanism, an arm 74 is arranged to strike the end of the arm 66, the arm 74 being secured to the post 75 which turns in the table 19 and is provided with a finger piece or button 76 by which it can be turned. Thus by turning the part 76 and post 75, the arm 74 engages the free end of the lever arm 66, pulls on the rod 61, and permits the motor to start. The motor is also adapted to be started by the coin controlled mechanism C shown in Fig. 6, and which I do not here describe, as it has nothing to do with the invention, but when this is used, a push plate shown by dotted lines at 77, is forced into engagement with the end 72ª of the slide bar 72 so as to push the bar inward. To provide for guiding the bar and also for carrying out the functions presently described, it is provided with a second slot 78 which receives the pin 79 on the tilting lever 80 which is arranged horizontally beneath the table 19, being pivoted as shown at 81 and having a hub 82 (see Fig. 9) which turns on the face plate 83, this serving as a support beneath the table top for the several parts of the motor starting mechanism. The lever 80 is arranged at nearly right angles to the plate 72, and it has an inwardly extending arm 84 which connects by a spring 85 with an off-set 86 near the end of the slide bar 72, while the free end of the lever 80 is adapted as shown at 87, to tip into engagement with a foot 56 of the brake strap 55, thus at the desired time checking the motor. When the slot or coin mechanism is used to start the machine, the part 77 pushes the slide plate 72 inward against the tension of the springs 73 and 85, and the pin 70 (see Fig. 6) striking the end wall of the slot 71, tilts the lever 67 and pulls on the rod 61, thus removing the trip or abutment 57 from the brake foot 56, while at the same time the lever 80 will be tilted to bring the end 87 in front of the foot piece 56, but this is only momentarily, as the lever 80 springs back to the position shown in Fig. 6, thus leaving the motor in operation until stopped automatically by the mechanism which will be hereinafter described.

The following mechanism is used for stopping the machine automatically: Referring to Figs. 3 and 9, it will be seen that the off-set 58ª of the arm 58 is provided with an extension arm 88 which is pivoted on the off-set 58ª as shown at 89, and is transversely slotted as at 90 to receive the screw 91 which extends into the off-set 58ª and by means of which the extension arm 88 can be adjusted and secured at a desired angle. The arm 88 is adapted to engage the raised end 92 on the off-set 93 of a tilting lever 94 (see Figs. 3 and 5) which lever is fulcrumed as shown at 95 on the back of the main frame or pedestal 27ª, and the upper end 96 of which projects above the frame 27 (see Fig. 4) and is connected to a rod 97 extending horizontally along the frame 27 and having at the end nuts 98 which are engaged by the traveling carriage 99 carrying the reproducer 120 hereinafter referred to, so that when a record is played and the carriage nears the end of its stroke, it will engage the nuts 98, pull on the rod 97, tilt the lever 94—96, and push the part 92 from beneath the arm 88, thus permitting the arm 58 and trip 57 to swing back by gravity into position for the latter to engage the brake foot 56 and stop the machine, but during the playing the arm 88 is held raised by the part 92, thus holding the trip 57 retracted in the position shown in Fig. 7. Referring to Figs. 3 and 5, it will be seen that the lever 94 is connected by an arm 100 with the pin 101 which slides in the bushing or bearing 102 on the frame 27ª, and is adapted to enter one of the holes 103 in the wheel plate 37 (see Fig. 2) thus holding the record wheel A steady while a record is being played. The pin 101 has a shoulder 101ª (Figs. 5 and 10), which at certain times engages the member 157 hereinafter referred to, and stops the inward movement of the pin 101 so that while the pin is so stopped the record wheel may turn freely. The pin 101 is normally pressed into engagement with the aforesaid holes by a flat spring 104, though of course other forms of springs might be used, this spring as shown in Figs. 5 and 12 being secured to posts 105 on the frame 27ª. It will thus be seen that the locking pin 101 works with the lever 94, so that when the lever is tilted to hold the machine in playing position, the pin 101 locks the wheel as just described, and when it is tilted into position to lock the motor, it pulls out the pin 101 and releases the wheel A so that the latter can turn freely.

In Fig. 9 I have shown a safety attachment adapted to the coin operating machine to prevent the machine from being started by tipping it to one side so as to release the foot piece 56 from the trip 57. This comprises a freely hanging arm or pawl 106 which is pivoted on the frame 60 as shown at 107, and has an in-turned end 108 which in case of such tipping will swing against the drum 54 and engage the brake foot 56.

Referring to Fig. 4, it will be seen that the shaft 25 which is driven direct from the motor as already described, is provided with two pinions 109 and 110 meshing respectively with the gear wheels 111 and 112 which are carried on the sliding sleeve 113 which is mounted on the screw shaft 114, this carrying the screw 115 which moves the carriage 99 and the reproducer 120. I do not refer to the screw and carriage mechanism in detail, for these are similar to the construction shown in Letters Patent of the United States No. 883,971, dated April 7, 1908. The sleeve 113 has a limited movement because of the slot 116 in the sleeve which receives the pin 117 which enters the shaft 114. The sleeve is provided with a milled surface 118 by which it can be easily grasped, and it may be readily moved endwise so as to bring the pinion 109 and gear 111, or the pinion 110 and gear 112 into engagement. The object of this arrangement is to adapt the machine to fast or slow feed, according as to whether it is to play so-called two minute or four minute records. In one case it is driven at high speed by the pinion 109 and gear 111, and in the other case it is driven by the pinion 110 and gear 112. The carriage 99 is provided with a blade 119 which engages the screw 115, and the reproducer 120 is thus moved across the record 39, and when this is finished, the reproducer is returned free of the record by the screw, the reproducer being lifted by the mechanism shown at C in Figs. 4 and 10. This mechanism I do not refer to in detail, because it is shown, described and claimed in the prior patent referred to.

The following mechanism is used for giving to the motor a slow or fast speed as desired. To regulate the speed of the motor I use an arrangement described below. A shaft 121 (see Fig. 4) is vertically arranged in the top of the machine and is provided with a hand 122 which can be turned to indicate fast or slow, as shown on the dial 123 of the drawing. The shaft is connected at its lower end with a wire 124 (see Fig. 3) which extends downward through the table 19 and is connected with a tilting bell crank 125 having a buffer 126 to contact with the disk 127 of the regulator shaft of the motor. The bell crank 125 is bent at right angles, is pivoted as shown at 125ª, and one arm 125ᵇ carries the buffer 126 above referred to. The bell crank is normally tilted by the spring 125ᶜ (see Fig. 15) so as to hold the buffer 126 out of contact with the disk 127 of the motor, but the bell crank is provided with an arm 125ᵈ which serves as an abutment against which the end of the screw 125ᵉ presses. This screw is threaded into the motor frame as shown in the drawing, and it will be seen that by turning the rod 124 the bell crank may be tilted down so as to push the buffer 126 against the disk 127. At the upper end the rod 124 is fastened to a plug 125ᶠ (see Fig. 3) which enters the rod 121 above referred to, and is held by a set screw 125ᵍ. It will be seen, therefore, that the rod 124 may be turned by hand before tightening the set screw 125ᵍ, so as to set the bell crank 125, and then the set screw 125ᵍ may be tightened, after which the speed can be regulated by turning the button or finger piece 121 and operating the screw 125ᵉ as described.

The following mechanism is used for automatically turning the record wheel A and advancing a new record 39 to position to be played: Referring to Fig. 4, it will be seen that the carriage 99 is provided with a stud 128 to which is attached a chain or cable 129 which runs over guide pulleys 130, 131 and 132, and is connected to the end of the rod 133 (see Fig. 10) which rod slides through the end 134 of a tilting arm 135, the rod 133 having a loose collar 136 abutting with the part 134 of the arm 135, and the collar being pressed by a spring 137 which is wound around the rod and abuts with the nuts 138 on the ends of the rod. Thus the return movement of the carriage after playing a record will pull on the cable 129 and lift the arm 135, the movement being cushioned by the spring 137. The arm 135 (see Fig. 11), is provided with a hub 139 which turns on the main shaft 41, and the arm is forked as shown at 140 in Fig. 11, to receive the pivot 142 of the pawl 141 which swings vertically in the arm and which has a weighted lower end 143 adapted to normally swing the head 144 of the pawl into engagement with one of the pins 145 of the record wheel A. These pins are shown in Fig. 5 extending rearwardly from the back plate 37 of the wheel A, and there is a pin for every record, the pins being spaced apart a distance corresponding to the space between the several records. The head 144 has a laterally extending pin 146 which is adapted to slide down the curved arm 147 during the forward movement of the carriage, and guide and tilt the pawl 143 so that the head 144 will be out of the path of the pins 145, thus permitting the record wheel to turn freely. When the arm 135 is pulled forward to advance the record wheel, the pawl 141 is carried away from the guide 147 and swings by gravity so as to bring the head 144 into engagement with one of the pins 145 of the record wheel. The pin 146 also extends in front of one fork of the arm 135 so that when the latter is pulled forward and upward, it will strike the pin 146, hold the pawl rigid, and carry forward the record wheel which is engaged by the pawl. The arm 147 is carried in a socket 148 (see Fig. 10) on the main frame 27ª, but the arm can be supported in any convenient way. The arm 135 is in the form of a bell crank, and has a short arm 149 (see Fig. 10) which connects by means of the link 150 with the weighted lever 153. The link 150 is slotted as shown at 151 to receive a pin 152 extending from the lever 153 so as to permit a certain amount of movement of the link before the lever 153 is actuated. The lever 153 is pivoted as shown at 153ª to the post 27ª, and at the longer end of the lever is a weight 154. The shorter end of the lever supports as shown at 153ᵇ in Fig. 16, one end of the shaft 49, which carries the friction wheel 48 for turning the record wheel into a desired position, as already described. Thus it will be seen that when the arm 153 is actuated to cause the pawl 141 to engage one of the pins 145, the lever 153 will be raised so as to drop the short end of the lever and bring the friction wheel 48 out of engagement with the rim of the record wheel A, and this prevents any one from turning the shaft 49, and so moving or displacing the record wheel when it is in playing position or approaching playing position. The journal of the shaft 49 in the bracket 51ª is narrow, and sufficiently loose to permit the tilting of the shaft as above described. On the shaft 41 at the side of the arm 135, is a tilting lever 155, the upper end 156 of which engages the pin 146 and prevents the pawl 141 from going too far forward, while the lower end 157 of the lever 155 moves into the path of the pin or arm 101 above referred to. The lever 155 is provided with a weight 159 which causes the lever to normally swing to the position shown in Fig. 10. When a record has been played, the carriage 99 will be at the front of the frame 27, and on its return stroke to carry the reproducer back to position to play a new record, the carriage will pull on the cable 129, thus swinging upward and forward the arm 135 and the pawl 141, and the head 144 of the pawl will engage one of the pins 145 and will carry the record wheel A forward so as to bring a new record into position to engage the reproducer. At the same time the lever 155 will be struck and carried forward by the pin 146, thus tilting the member 157 out of the path of the pin 101, so that the pin can enter one of the holes 103 and lock the record wheel; and the link 150 and lever 153 will be raised, thus dropping the friction wheel 48 out of engagement with the rim of the record wheel. On the opposite or forward movement of the carriage, the weights 154 and 159 bring the aforesaid parts back to the first position, the pin 146 slides down the abutment or arm 147, thus bringing the head 144 of the pawl out of the path of the pins 145 while the friction wheel 48 is again in engagement with the wheel rim 37, and the wheel can be turned by means of the shaft 49 so as to bring another record besides the next one in sequence, into position if so desired.

When the records 39 are placed on the record holders, the records are adjusted so that the beginning of the reproduction will come opposite the end of the gage 160 (see Figs. 3 and 5) which is supported in the upper part of the machine as a gage or indicator to tell when the records are in correct position.

The general operation of the machine is as follows: When the machine is to be started, the carriage 99 will always be at the front end of the screw 115 as shown in Fig. 4, and the part or member 157 will be in the path of the shoulder 101ª of the pin 101, thus preventing the pin from locking the record wheel, and leaving the latter free to turn. The machine will then be started by turning the button 65 and tripping the motor by moving the part 57 from in front of the member 56 of the motor spring. This action starts the bell-crank 58—58ª and raises the arm 88 to a point above the end 92 of the lever 94. Meanwhile the inward movement of the carriage pulling on the cable 129, will have pulled on the arm 135, and through the connections already described, tilted the part 157 out of the path of the shoulder 101ª, so that when a hole in the wheel A comes opposite the pin 101, the latter will spring in and lock the wheel, during which movement the lower part of the lever 94 will move inward slightly, but not enough to remove the end 92 from under the arm 88. The weight of this lever 94, assisted by the spring 101, causes the end 92 of the lever 94 to move under the arm 88 as stated, thus sustaining the arm until a record has been played, and holding the part 57 out of the path of the member 56 of the motor spring. During the inward movement of the carriage 99 as above noted, the pull on the cable 129 and arm 135 and its connecting mechanism, brings said mechanism forward and carries with it the record wheel so as to bring the next cylinder to its playing position where it is locked by the action of the pin 101 just above described. The same action will have raised the link 150 and the lever 153 so as to drop the short end of the lever and move the friction wheel 48 out of engagement with the rim of the wheel A. At this moment the carriage begins to move forward in the act of playing, thus loosening the cable 129, as the carriage 99 progresses, and the arm 135 and connected parts move back to the former position as already described. The movement of the carriage through the pull on the rod 97, tilts the lever 94 so as to move out the lower end of the lever, thus moving the part 92 from beneath the arm 88, and the latter drops by gravity so that the part 57 again swings into the path of the spring end 56, thereby stopping the machine, while the part 157 at the same movement swings in front of the shoulder 101ª and prevents the inward movement of the locking pin 101.

From the foregoing description it will be seen that I have shown a machine in which the parts are very complete and simple, and in which they co-act in such a way as to make an absolutely reliable machine in which the records can be automatically played in sequence, or in which any record can be selected if preferred.

I claim:—

1. The combination with a rotatable record wheel having holes in the rim, of a spring-pressed locking pin or arm slidable in a support and adapted to enter the holes to lock the wheel while a record is in playing position, the reproducer carriage, a tilting lever actuated by the movement of the carriage, and pressing against the aforesaid locking pin, means controlled by the lever for stopping and starting the motor, means for restraining the locking pin against the action of the aforesaid lever, and an operative connection between the carriage and the means for restraining the movement of the locking pin, whereby the locking pin is released at a certain point during the movement of the carriage.

2. The combination with the rotatable record wheel, of a spring pressed pin or arm adapted to engage and lock the wheel while a record is in playing position, the reproducer carriage, a movable member adapted to extend into the path of the aforesaid locking pin, means controlled by the carriage to move the said member and release the pin or arm, and means also controlled by the movement of the carriage for withdrawing the aforesaid pin or arm.

3. The combination with the rotatable record wheel, of a sliding pin or arm adapted to engage and lock the wheel while a record is in playing position, the reproducer carriage, a movable member arranged to engage the locking pin or arm and prevent its movement into locked position with the record wheel, means controlled by the movement of the carriage for releasing the said locking pin or arm, and means also controlled by the movement of the carriage for withdrawing the said pin or arm from engagement with the record wheel.

4. In a machine of the kind described, the combination of the motor, the brake strap connected with the motor and provided with a projecting end, the reproducer carriage, the rotatable record wheel, means for locking the record wheel when a record is in playing position, a tilting lever actuated by the movement of the carriage, a swinging foot piece to engage the strap end and stop the motor, an operative connection between the lever and the aforesaid foot piece by which the movement of the lever actuates the foot piece, and means also operated by the aforesaid lever for actuating the record wheel locking mechanism.

5. The combination with the record wheel having abutments thereon, and the reproducer carriage, of a swinging arm, a pawl carried by the arm and adapted to engage the abutments on the record wheel to turn the latter, a cable connected with the reproducer carriage, and a cushioned or yielding connection between the cable and the aforesaid swinging arm.

6. The combination with the record wheel having pins or abutments thereon, the reproducer carriage, and a hand operated friction wheel for turning the record wheel, of a swinging arm, a pawl carried by the arm to engage the abutments on the record wheel, a cable connection between the swinging arm and the reproducer carriage, and means actuated from the swinging arm to carry the aforesaid friction wheel into and out of engagement with the record wheel.

7. The combination with the record wheel having pins or abutments thereon, and the reproducer carriage sliding opposite the record wheel, of a swinging arm opposite the record wheel, a swinging pawl carried by the arm and adapted to engage the abutments on the record wheel, a cable connection between the swinging arm and the reproducer carriage, whereby the return movement of the carriage raises the arm and turns the record wheel, and guiding means operating on the lowering of the aforesaid arm to tilt the pawl out of the path of the aforesaid pins or abutments.

8. The combination with the rotatable record wheel having pins or abutments thereon, and the sliding reproducer carriage, of the swinging forked arm opposite the record wheel, a cable connection between the swinging arm and the reproducer carriage, a pawl adapted to engage the pins or abutments on the record wheel, said pawl being pivoted in the fork of the aforesaid swinging arm, a pin extending laterally from the head of the pawl and above one fork of the swinging arm, and a guide arm or abutment supported on the machine frame and adapted to engage the aforesaid pin on the downward movement of the pawl, thereby tilting the pawl.

9. The combination with the rotatable record wheel having pins or abutments thereon, and the reproducer carriage, of a swinging forked arm pivoted opposite the record wheel, a pawl pivoted in the fork of the arm and provided with a laterally extending pin, the pawl being arranged to engage the aforesaid pins or abutments, a guide arm to engage and tilt the pawl on the downward or return movement of the latter, a weighted tilting lever at the side of the aforesaid swinging arm, said lever having a limited movement, and an arm on the lever extending into the path of the pin on the pawl.

10. The combination with the rotatable record wheel, the reproducer carriage, and means actuated by the movement of the carriage to turn the record wheel to advance a record to playing position, of a manually operated friction wheel to engage and turn the record wheel, and means operated by the actuating means for turning the record wheel to throw the friction wheel into and out of engagement with the record wheel.

11. The combination with the rotatable record wheel having holes therein, the motor, and the reproducer carriage, of a tilting lever, means controlled by the lever for stopping and starting the motor, means controlled by the movement of the carriage for turning the record wheel, a pin or arm carried by the aforesaid tilting lever and adapted to enter the holes in the record wheel, and a tilting member also controlled by the reproducer carriage and adapted to swing into the path of the aforesaid locking arm or pin.

JULIUS ROEVER.

Witnesses:
WARREN B. HUTCHINSON,
ARTHUR G. DANNELL.